(12) United States Patent
Sinkhorn

(10) Patent No.: US 9,506,832 B2
(45) Date of Patent: Nov. 29, 2016

(54) PORTABLE HIGH SPEED BALANCE MACHINE

(71) Applicant: Jason Sinkhorn, Greensburg, PA (US)

(72) Inventor: Jason Sinkhorn, Greensburg, PA (US)

(73) Assignee: Laurel Valley Power Company, LLC, Greensburg, PA (US)

( * ) Notice: Subject to any disclaimer, the term of this patent is extended or adjusted under 35 U.S.C. 154(b) by 255 days.

(21) Appl. No.: 14/531,673

(22) Filed: Nov. 3, 2014

(65) Prior Publication Data

US 2015/0128698 A1 May 14, 2015

Related U.S. Application Data

(60) Provisional application No. 61/901,682, filed on Nov. 8, 2013.

(51) Int. Cl.
*G01M 1/16* (2006.01)
*G01M 1/04* (2006.01)
*F01D 5/02* (2006.01)

(52) U.S. Cl.
CPC .............. *G01M 1/04* (2013.01); *F01D 5/027* (2013.01)

(58) Field of Classification Search
CPC ....................................................... G01M 1/16
USPC ................................................. 73/460, 462
See application file for complete search history.

(56) References Cited

U.S. PATENT DOCUMENTS

| | | |
|---|---|---|
| 1,437,798 A | 12/1922 | Flanders |
| 1,553,936 A | 9/1925 | Feeney |
| 2,165,024 A | 7/1939 | Baker et al. |
| 3,336,818 A | 8/1967 | Allen |
| 3,572,620 A * | 3/1971 | Kincaid ............... G01M 1/04 248/370 |
| 4,177,692 A | 12/1979 | Irwin |
| 4,545,247 A * | 10/1985 | Wilson ................. G01M 1/04 73/466 |
| 5,011,374 A | 4/1991 | Miller |
| 5,214,585 A | 5/1993 | Ehrich |
| 6,481,969 B2 | 11/2002 | Berry et al. |
| 6,618,646 B1 | 9/2003 | Dyer |
| 6,883,373 B2 | 4/2005 | Dyer |
| 7,155,973 B2 | 1/2007 | Dyer |
| 7,454,970 B2 | 11/2008 | Dyer |
| 7,465,146 B2 | 12/2008 | Kennedy et al. |
| 7,546,685 B2 | 6/2009 | Ganesh et al. |
| 7,646,128 B2 | 1/2010 | Bode et al. |
| 7,685,876 B2 | 3/2010 | Mollmann et al. |
| 8,046,109 B2 | 10/2011 | Larsen et al. |
| 8,051,709 B2 | 11/2011 | Allen et al. |
| 8,051,710 B2 | 11/2011 | Van Dam et al. |
| 8,100,009 B2 | 1/2012 | Dyer |
| 8,186,955 B2 | 5/2012 | Buskirk et al. |
| 2007/0128385 A1 | 6/2007 | Kennedy et al. |
| 2009/0133494 A1 | 5/2009 | Van Dam et al. |

(Continued)

FOREIGN PATENT DOCUMENTS

DE GB 2510715 A * 8/2014 .............. G01M 1/24

*Primary Examiner* — Lisa Caputo
*Assistant Examiner* — Jamel Williams
(74) *Attorney, Agent, or Firm* — Michael Best & Friedrich LLP

(57) ABSTRACT

A portable machine includes a base assembly defining a vacuum chamber, the base assembly including a decking having a machine way. The portable machine also includes a machine component releasably coupled to the machine way, and a plurality of load-equalizing members coupled to the base assembly that evenly distribute and support a load positioned on the base.

20 Claims, 13 Drawing Sheets

(56) References Cited

U.S. PATENT DOCUMENTS

| | | | | |
|---|---|---|---|---|
| 2010/0064801 A1* | 3/2010 | Hylton | ................... | G01M 1/32 73/468 |
| 2011/0023599 A1* | 2/2011 | Zhu | ........................ | G01M 1/06 73/462 |
| 2011/0226055 A1* | 9/2011 | Rogalla | ................... | G01M 1/32 73/468 |
| 2012/0028545 A1* | 2/2012 | Duescher | ................ | B24B 37/04 451/28 |
| 2013/0111989 A1* | 5/2013 | Casadio | ................... | F01D 5/027 73/460 |

\* cited by examiner

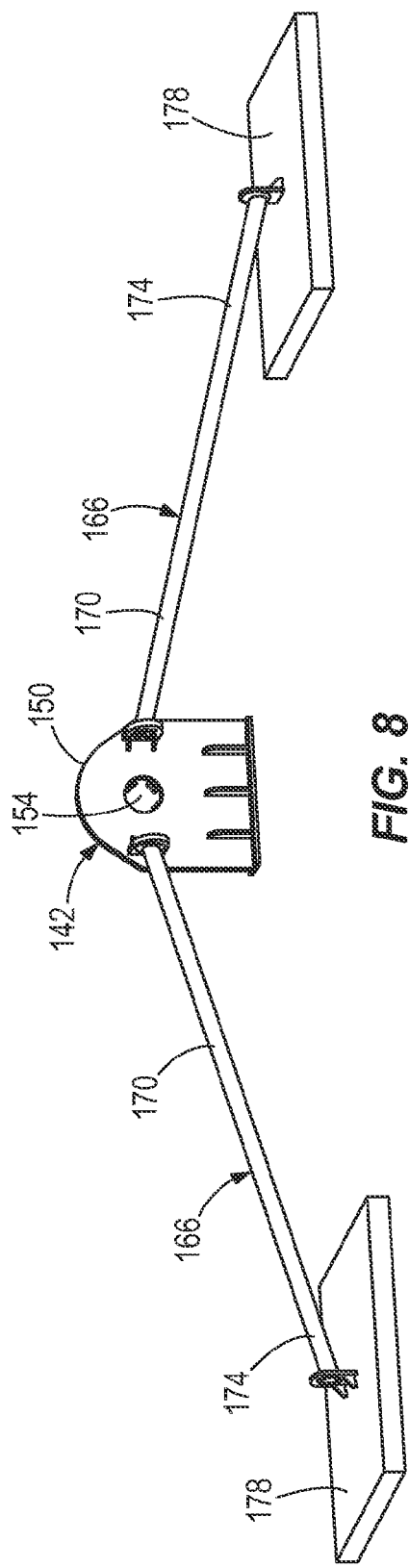
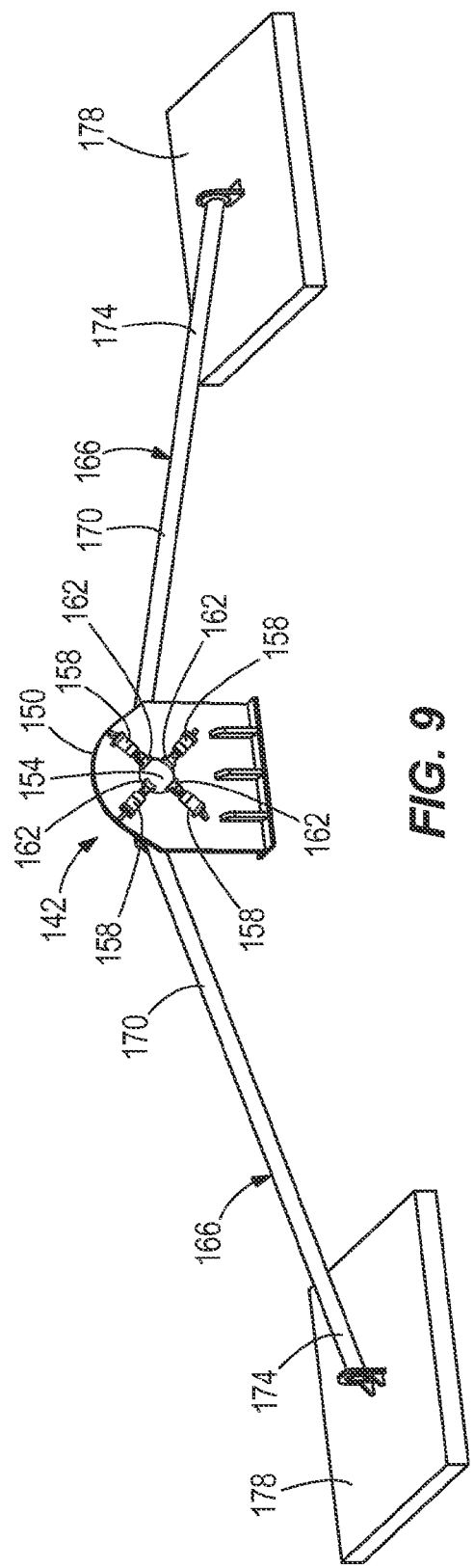

PORTABLE HIGH SPEED BALANCE MACHINE

CROSS-REFERENCE TO RELATED APPLICATIONS

This application claims priority to U.S. Provisional Application No. 61/901,682, filed Nov. 8, 2013, the entire contents of which are incorporated herein by reference.

BACKGROUND

The present invention relates to balance machines, and specifically to portable high speed balance machines.

High speed balance machines are used to balance rotating mechanical components including large rotors for turbines, generators, and the like. High speed balance machines typically include pedestals that support bearings which permit rotation of the component to be balanced. The machines also include suspensions coupled to the pedestals and bearings. As the component is rotated, one or more sensors on the suspension detect any unbalance in the component.

SUMMARY

In accordance with one construction, the invention provides a portable machine that includes a base assembly defining a vacuum chamber, the base assembly including a decking having a machine way. The portable machine also includes a machine component releasably coupled to the machine way, and a plurality of load-equalizing members coupled to the base assembly that evenly distribute and support a load positioned on the base.

In accordance with another construction, the invention provides a portable machine that includes a base assembly defining a vacuum chamber, the base assembly including a decking and a seal below the decking that seals the base assembly to a ground surface. The decking includes a machine way. The machine also includes a pedestal assembly releasably coupled to the machine way above the vacuum chamber. The pedestal assembly includes a first pedestal and a second pedestal that are separately movable axially relative to one another along the machine way. The machine also includes a plurality of load-equalizing members coupled to the base assembly, the load-equalizing members including hydraulic cylinders that contact the ground surface to support the base assembly and pedestal assembly. The machine also includes a pressure control module that controls pressure within each of the hydraulic cylinders.

Other aspects of the invention will become apparent by consideration of the detailed description and accompanying drawings.

BRIEF DESCRIPTION OF THE DRAWINGS

FIG. 8 is a front perspective view of a portion of the balance machine of FIG. 1, including a brake assembly, moment bars, and base plates.

FIG. 9 is a back perspective view of the portion shown in FIG. 8.

Figure 1:
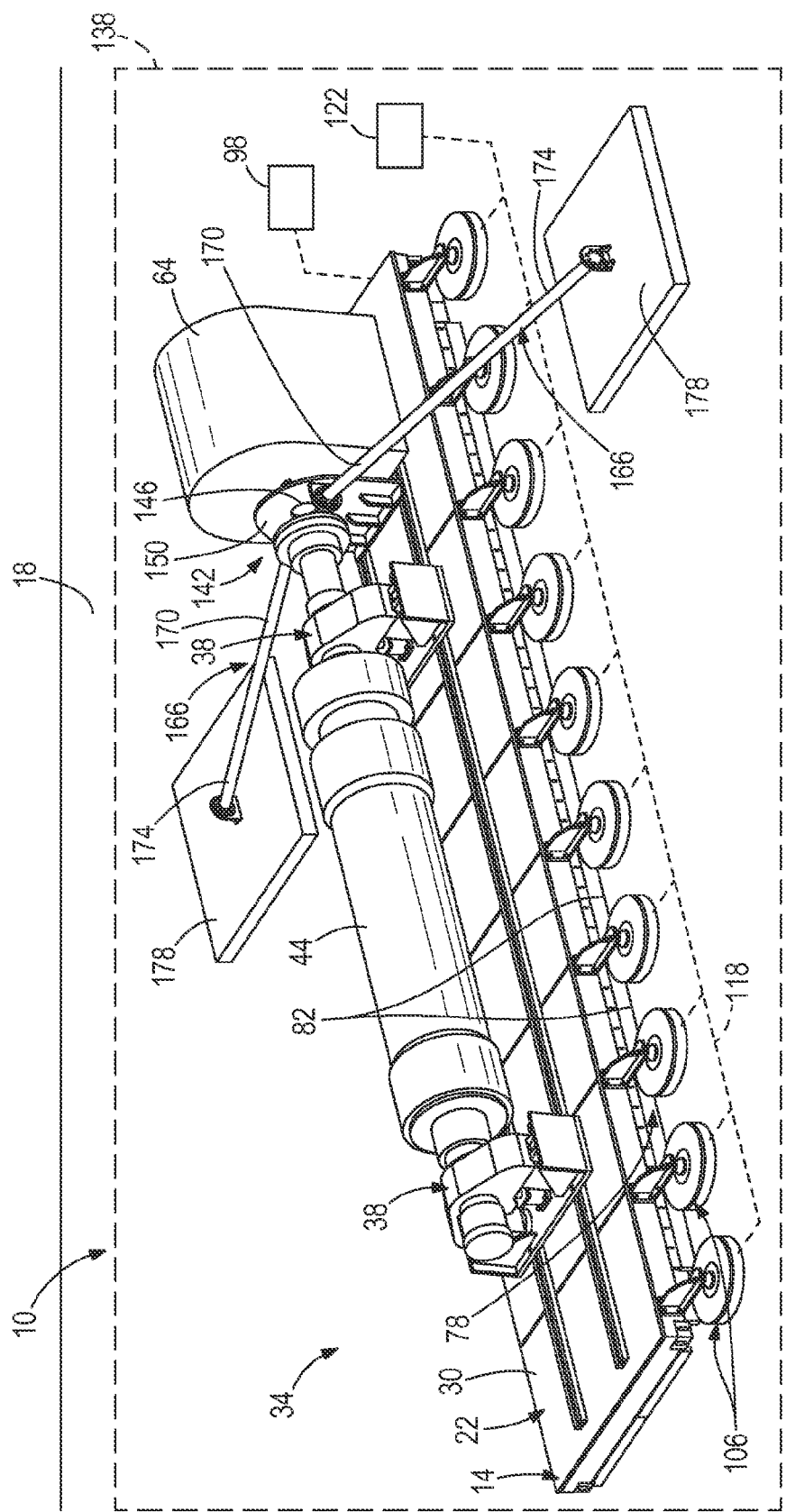
FIG. 1 is a perspective, partially schematic view of a balance machine according to one construction of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

FIGS. 1-11 illustrate a portable high speed balance machine 10. The machine 10 includes a base assembly 14 sized and configured to rest upon a surface 18, such as a concrete floor. The base assembly 14 includes a decking 22 that is a rigid, elongate, generally rectangular structure. The decking 22 is made of aluminum, although other constructions use different materials. The decking 22 includes two machine ways 26 disposed along a top surface 30 of the decking 22. The machine ways 26 are steel guide structures, and are disposed parallel to one another along the top surface 30. The machine ways 26 couple to and guide a pedestal assembly 34 or other machine component along the decking 22 to allow the pedestals to be positioned at any desired spacing.

Figure 6:
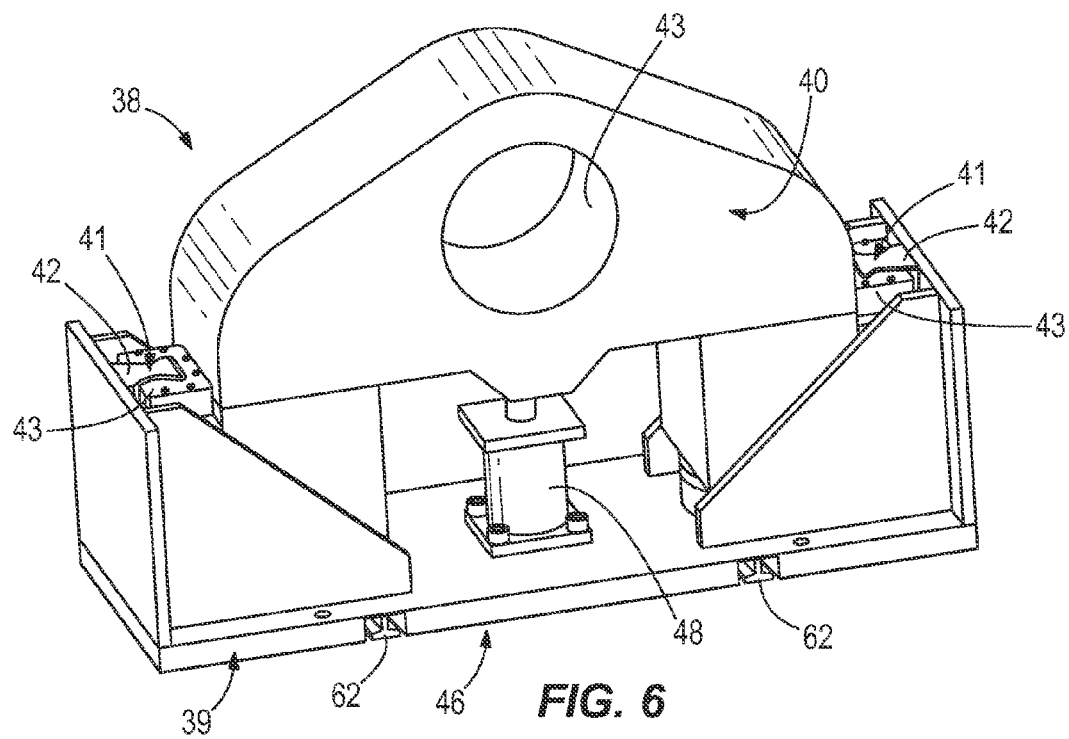
FIG. 6 is a perspective, partially schematic view of a pedestal for use with the balance machine of FIG. 1.
Figure 7:
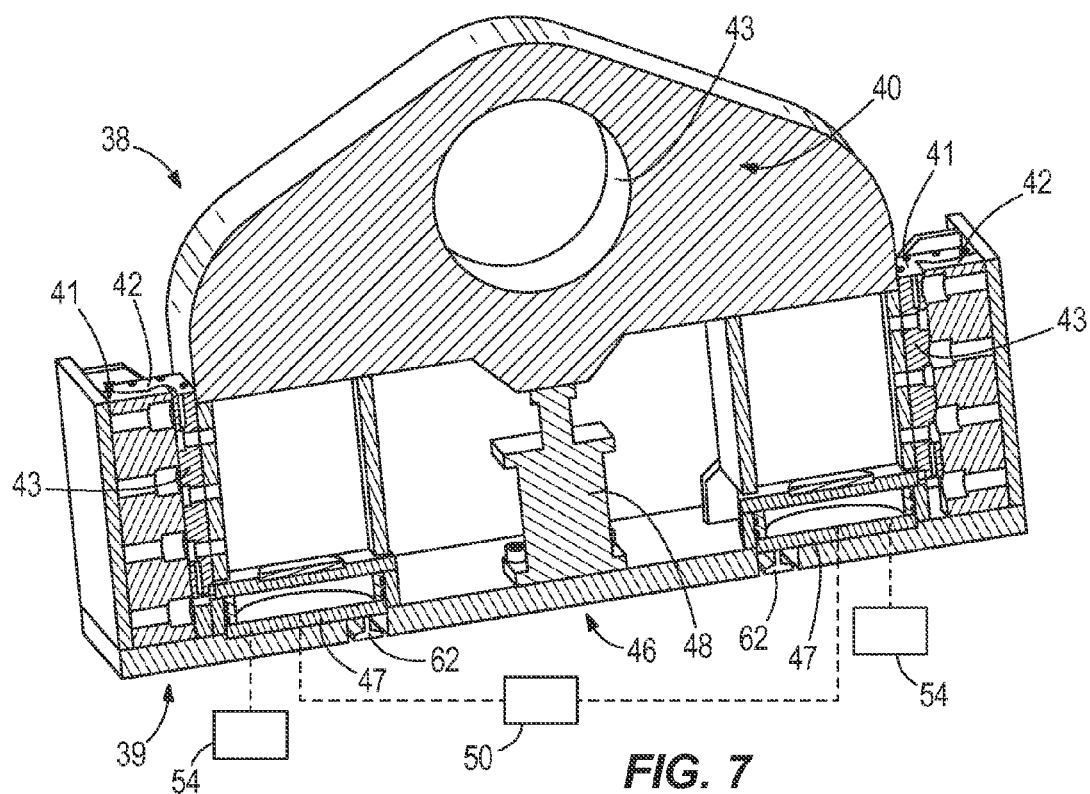
FIG. 7 is a cross-sectional view of the pedestal of FIG. 6.

As illustrated in FIGS. 1, 6, and 7, the pedestal assembly 34 includes two pedestals 38. With reference to FIGS. 6 and 7, each pedestal 38 includes a base portion 39 and a bearing portion 40. The bearing portion 40 is coupled to the base portion 39 via two linear motion rail and slider mechanisms 41 that permit the bearing portion 40 to slide linearly (e.g., vertically), and independently, relative to the base portion 39. The slider mechanisms 41 each include an inwardly protruding projection 42 on the base portion 39, and an outwardly protruding, generally U-shaped projection 43 on the bearing portion 40 that surrounds and grasps the projection 42 to restrain movement of the bearing portion 40 except in generally a linear direction (e.g., vertically).

As illustrated in FIGS. 6 and 7, the bearing portion 40 also includes a bearing 43 (e.g., oil lubricated journal bearing) for supporting a component 44 (e.g., a rotor, as illustrated in FIG. 1) to be balanced in the pedestal assembly 34.

With continued reference to FIGS. 6 and 7, each pedestal 38 is mounted on a spring/damper system 46 that includes a set of pneumatic springs 47 (FIG. 7) and a damper 48 to reduce dynamic forces transmitted to the surface 18. The spring/damper system 46 is tuned to the size of the component 44 being balanced to optimize vibration reduction. The damper 48 has a fixed damping coefficient and is adjusted prior to operation to suit various different components 44. The springs 47 are pneumatic springs whose spring rate is a function of a pressure supplied by an external pressure source 50 (illustrated schematically in FIG. 7). The source 50 is PLC controlled and adjusts spring rate (via pressure control) as a function of the rotational speed of the component 44 for optimum damping. During operation, the slider mechanism 41 facilitates reduction of dynamic forces generated by the springs 47 and the damper 48.

The pedestal assembly 34 also includes sensors 54 (illustrated schematically in FIG. 7) coupled to the pedestals 38 (e.g., to the spring/damper systems 46) that measure unbalance in the pedestals 38 and/or component 44 based on motion in the spring-damper systems 46.

Figure 5:
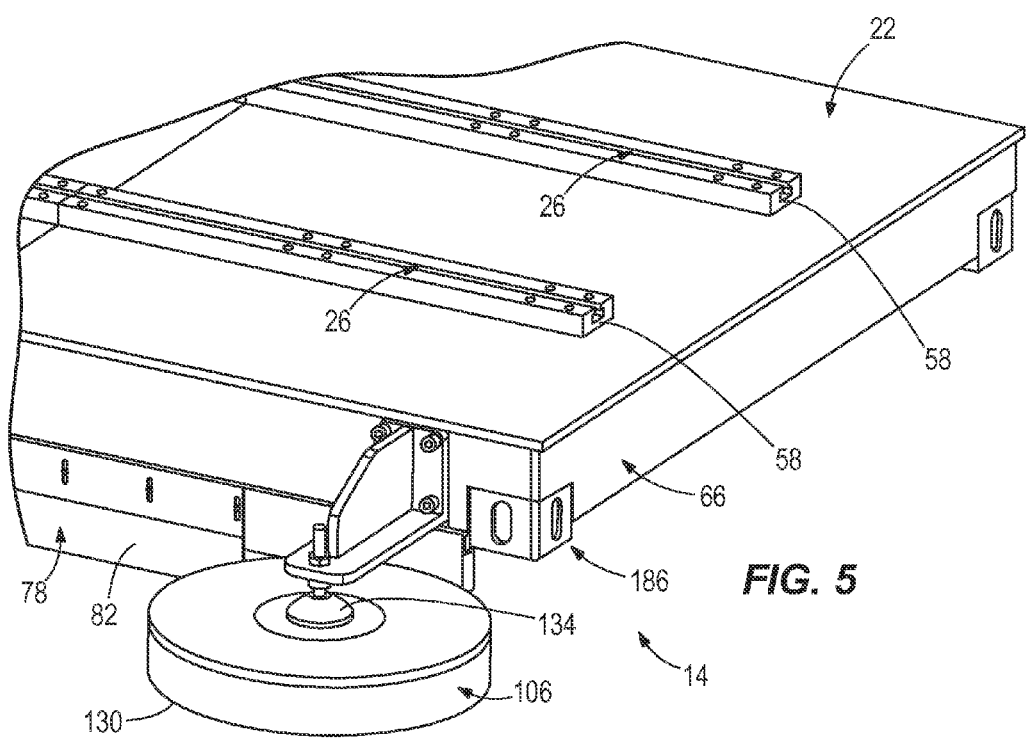
FIG. 5 is a partial, enlarged view of the balance machine of FIG. 1.

With reference to FIG. 5, the machine ways 26 each include a T-shaped elongate slot 58. With reference to FIGS. 6 and 7, the pedestal assembly 34 includes correspondingly-sized T-shaped nuts 62 on the pedestals 38 that slide within the T-shaped slots 58, such that the pedestal assembly 34 is slidable along the decking 22. The machine ways 26 permit the pedestals 38 to slide along the base assembly 14 until the pedestals 38 are at desired locations (e.g., to accommodate for different-sized components 44), and to be easily assembled and disassembled from the decking 22. In some constructions the pedestal assembly 34 further includes a locking structure that temporarily locks the pedestals 38 in place on top of the decking 22 while in use.

With reference to FIG. 1, the machine 10 includes a machine drive/controller 64 that drives rotation of the component 44. The drive/controller 64 also includes T-shaped nuts 62 (not shown) that permit the drive/controller 64 to also releasably couple to and slide along the machine ways 26.

Figure 2:
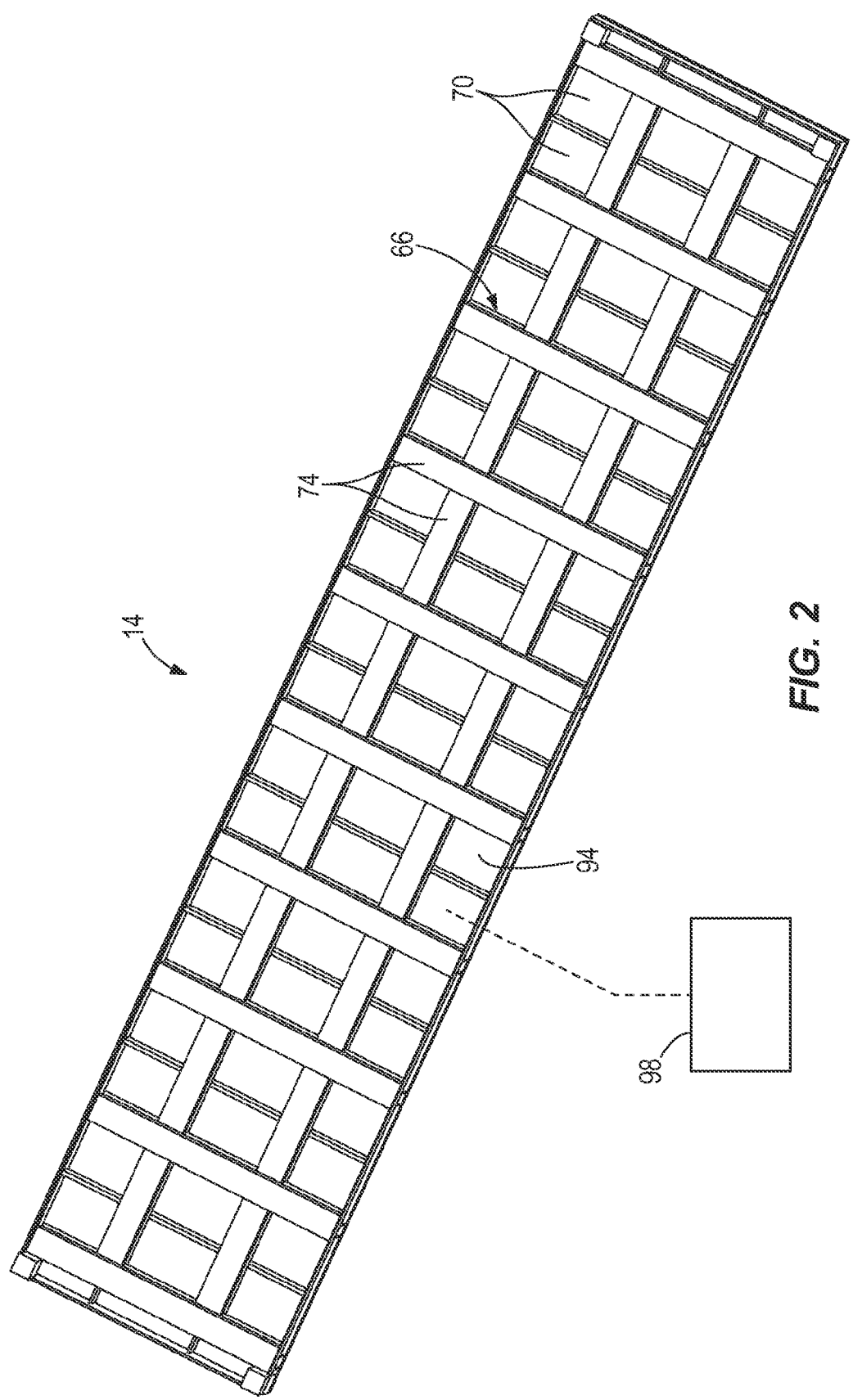
FIG. 2 is a bottom view of a base assembly of the balance machine of FIG. 1.

With reference to FIG. 2, the base assembly 14 includes a support structure 66 disposed beneath and coupled to the decking 22. The support structure 66 is a frame that includes plates 70 and wide flange beams 74 (e.g., I-beams) that are capable of withstanding significant lateral and vertical loads. The plates 70 and wide flange beams 74 are steel, although other constructions use different material. The support structure 66 is sealed to the decking 22 (e.g, with grooves (not shown) in the decking 22 that are filled with fluoropolymer sealant).

Figure 3:
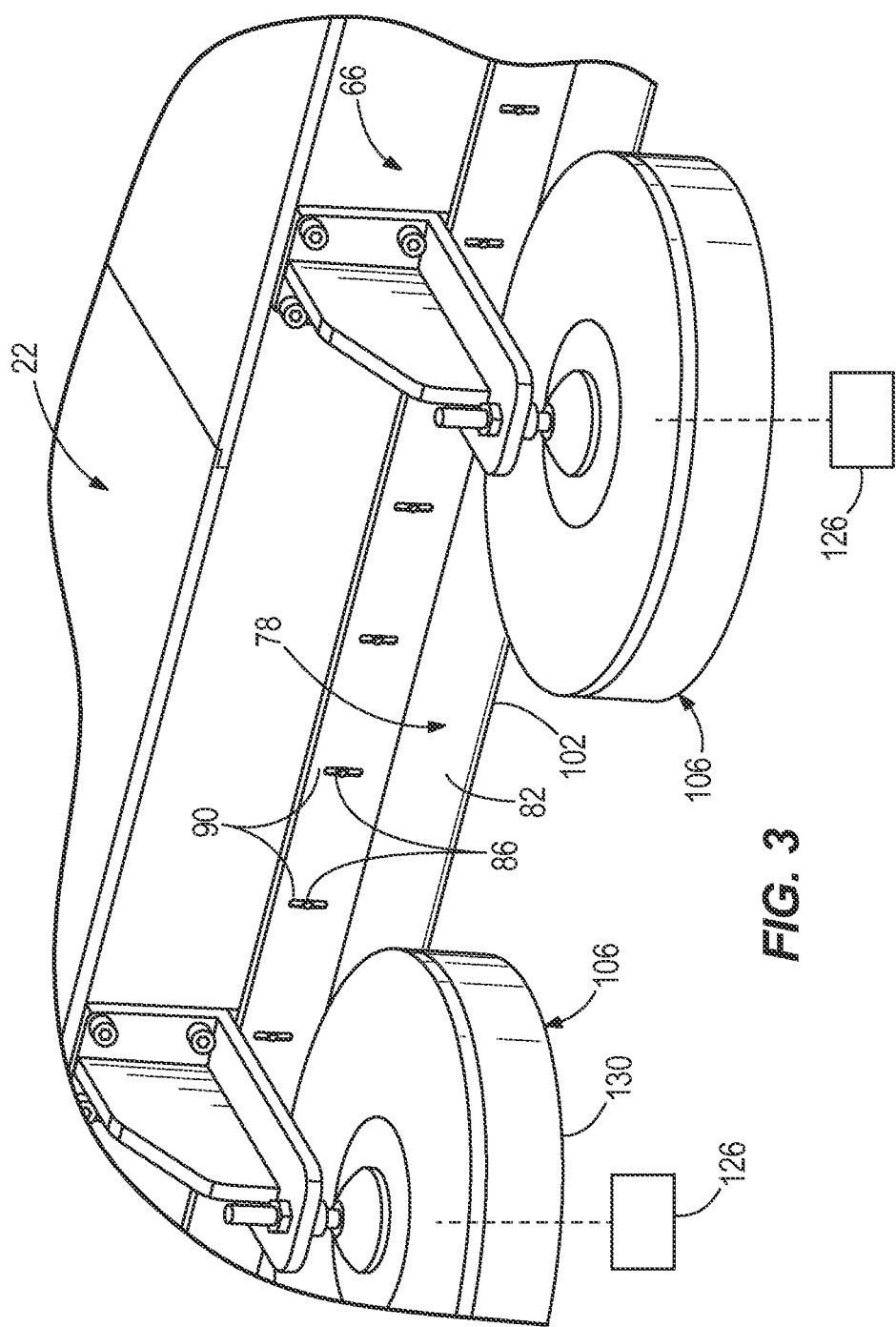
FIG. 3 is a partial, enlarged view of the balance machine of FIG. 1.

With reference to FIGS. 1 and 3, the base assembly 14 also includes a skirt 78 that extends at least partially around the support structure 66 and the decking 22. The skirt 78 includes segments 82 that are coupled to the support structure 66 and extend generally transverse to the decking 22 beneath the decking 22. The segments 82 are movable relative to the support structure 66 and the decking 22 to accommodate for an uneven surface 18. In particular, and as illustrated in FIG. 3, the support structure 66 includes protrusions 86, and the segments 82 include slots 90 that receive the protrusions 86. The protrusions 86 are movable within the slots 90 (e.g., are slidable up and down within the slots 90), such that a position of each segment 82 is adjustable relative to the support structure 66 and the decking 22. Other constructions include different structures that permit adjustment of the skirt 78 relative to the support structure 66 and the decking 22.

With continued reference to FIGS. 1 and 2, the base assembly 14 is releasably coupled to the surface 18 with vacuum pressure. In particular, the decking 22, the support structure 66, the skirt 78, and the surface 18 form a vacuum chamber 94 (illustrated in FIG. 2) disposed underneath the base assembly 14. The vacuum chamber 94 is coupled to a vacuum source 98 (illustrated schematically in FIGS. 1 and 2) that generates a vacuum within the vacuum chamber 94 to hold and secure the base assembly 14 to the surface 18. In some constructions the vacuum source 98 is the same as the external pressure source 50 described above.

In the illustrated construction, the vacuum source 98 creates an approximately 12 psi vacuum within the vacuum chamber 94, which creates a downward force (i.e., a force that presses the base assembly 14 onto the surface 18) of approximately 550,000 lbs. In other constructions the vacuum source 98 generates other vacuum pressures and downward forces. For example, in some constructions the vacuum source 98 generates a vacuum of between approximately 10 psi and 14 psi. In some constructions the downward force generated is between approximately 450,000 lbs and 650,000 lbs.

With reference to FIG. 3, each of the segments 82 includes a rubber seal 102 disposed along a lower edge of the segment 82. The seals 102 press against the surface 18 to help seal the base assembly 14 to the surface 18 when the vacuum is applied to the vacuum chamber 94 by the vacuum source 98.

With reference to FIGS. 1 and 3-5, the machine 10 also includes load-equalizing members 106 (e.g., pads) that are used to distribute loads acting on the base assembly 14. The members 106 are coupled to the base assembly 14. Ten members 106 are illustrated along one side of the base assembly 14 in FIG. 1, with ten additional members 106 (not illustrated) configured to be disposed along the opposite side. However, other constructions include various other numbers and arrangements of the members 106.

Figure 4:
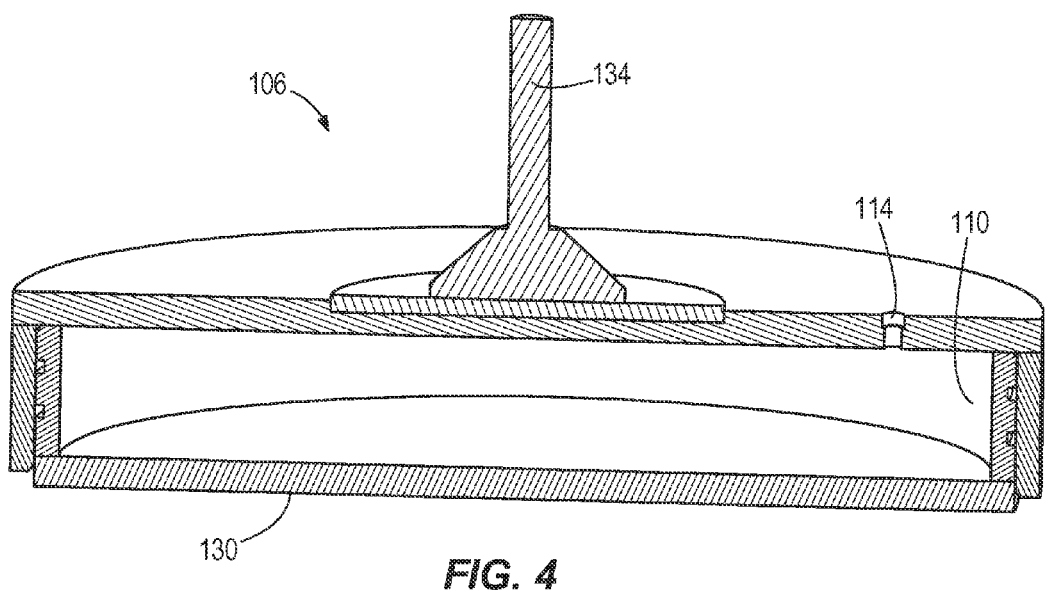
FIG. 4 is a partial, enlarged view of a load-equalizing member of the balance machine of FIG. 1.

The members 106 are spaced generally evenly apart from one another and are disposed alongside the skirt 78 outside of the vacuum chamber 94. The members 106 are pneumatically-operated, and are constructed similar to a pneumatic cylinder. As illustrated in FIG. 4, the members 106 each include an interior chamber 110 that receives pressurized fluid from an inlet 114. The members 106 are coupled to one another via a flexible line 118 (illustrated schematically in FIG. 1), and are all coupled to a pressure control module 122 (also illustrated schematically in FIG. 1), such that a static pressure is maintained in each member 106, and such that each member 106 carries an equal load. In order to compensate for dynamic forces during use of the machine 10, a control valve 126 (illustrated schematically in FIG. 3) may be added to each member 106 to control pressures in the members 106 and to maintain equal loads acting on each member 106. In this manner an overall load (including the downward vacuum force generated by the vacuum source 98, a weight of the component 44, and dynamic loads from unbalance during use of the machine 10) is distributed to the members 106. The members 106 are sized and configured to distribute the overall load such that a bending stress in the surface 18 remains acceptable. For example, where the surface 18 is a concrete flooring of approximately 6.00 inch thickness and unreinforced, the overall load distributed to the members 106 is such that a bending stress in the concrete flooring remains within acceptable standard limits (e.g., no greater than 3,000 psi per American Concrete Institute standards).

With continued reference to FIGS. 3-5, each of the members 106 also includes a friction pad 130 coupled to a bottom of the member 106. The friction pad 130 is made of a bonded rubber having a high coefficient of friction (e.g., between approximately 0.6 and 1.0). During use of the machine 10, dynamic loads experienced by the machine 10 are carried via friction between the friction pads 130 and the surface 18.

With continued reference to FIGS. 4 and 5, each of the members 106 also includes a swivel-mounted threaded stud 134 that couples the members 106 to the base assembly 14 and allows a level or position of the member 106 relative to the base assembly 14 to change, to accommodate for an uneven surface 18.

With reference to FIG. 1, the machine 10 also includes a housing 138 (illustrated schematically in FIG. 1) that surrounds at least the base assembly 14, the pedestal assembly 34, and the members 106. The housing 138 includes a ballistic shield made of a Hexcel® honeycomb aluminum core with a steel outer shell and an inner shell both made of a 0.13 inch aluminum sheet, with a layer of impact hardening gel (such as D30) in between the sheets. This composite structure is sized and configured to contain a 100 lb projectile released at up to 3600 rpm. Other constructions include different materials and arrangements for the housing 138.

In the event of a loss of oil supply or power a normally closed valve on the machine 10 is opened and the housing 138 (which may contain an emergency oil reservoir) feeds the oil-lubricated bearings 43 on the pedestal assembly 34 with oil during coast down.

With reference to FIGS. 1 and 8-10, in the event of a loss of a component or other high vibration event (e.g., an event that generates a greater than approximately 10 mils peak to peak vibration), the machine 10 will automatically engage a hydraulic brake assembly 142 to decelerate the component 44. The brake assembly 142 is coupled to the drive/controller 64, and acts on a drive shaft 146 of the drive/controller 64 to decelerate the component 44 within seconds (e.g., within approximately 2 seconds). The drive shaft 146 is coupled to (e.g. fastened to) the component 44, such that rotation of the drive shaft 146 causes rotation of the component 44 (e.g., at a rate equal to the drive shaft 146).

Figure 10:
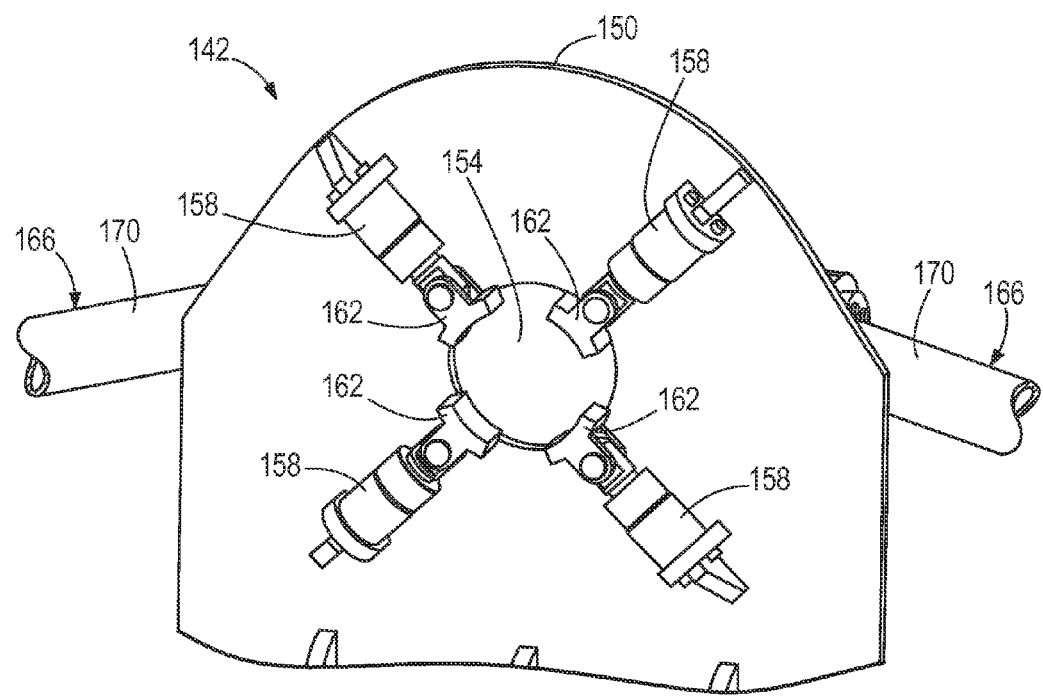
FIG. 10 is a partial, enlarged view of the brake assembly.

With continued reference to FIGS. 1 and 8-10, the brake assembly 142 includes a brake mounting plate 150 that is coupled to the ways 26 of the decking 22. The mounting plate 150 includes T-shaped nuts (not shown), similar to the T-shaped nuts described above, that slide within the ways 26. As illustrated in FIGS. 8-10, the mounting plate 150 includes an aperture 154 to receive the drive shaft 146, and a plurality of hydraulic cylinders 158 that are coupled to brake shoes 162. The hydraulic cylinders 158 and the brake shoes 162 are arranged circumferentially about the aperture 154, and are spaced generally evenly apart from one another. Each of the brake shoes 162 is movable both radially inwardly and away from the aperture 154 to engage and disengage, respectively, the rotating drive shaft 146. The hydraulic cylinders 158 and the brake shoes 162 are controlled by the drive/controller 64. The braking force applied by the brake shoes 162 is controlled via a feedback loop monitoring a shaft speed of the drive shaft 146, and may be adjusted to allow for pre-programmed deceleration rates of the drive shaft 146 and the component 44. The brake assembly 142 generates a total braking force of approximately 100 tons acting in a direction normal to an outer surface of the drive shaft 146 (i.e., in a radially inward direction). The illustrated construction includes four hydraulic cylinders 158 and four brake shoes 162 spaced approximately 90 degrees apart from one another, although other constructions include different numbers and arrangements than that illustrated.

With reference to FIGS. 1 and 8-11, the brake assembly 142 generates torque during application of the braking force. To contain the torque the machine 10 includes a set of moment bars 166 provided on either side of the mounting plate 150. The moment bars 166 operate similar to the members 106, but are staged farther outside of the base assembly 14 than the members 106.

Figure 11:
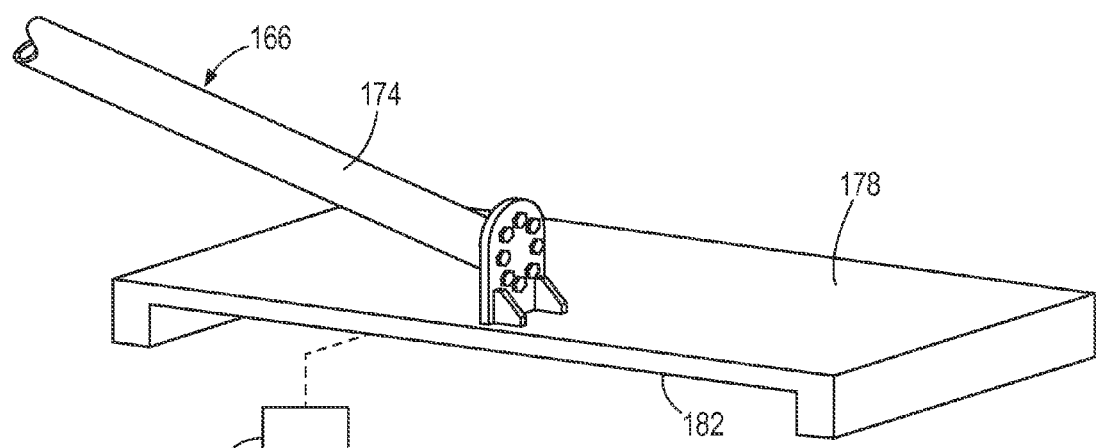
FIG. 11 is a partial, enlarged view of one of the moment arms and base plates.

Each moment bar 166 includes a first end 170 coupled to the mounting plate 150, and a second end 174 coupled to a base plate 178 resting on the surface 18. As illustrated in FIG. 11, the base plates 178 include hollow vacuum chambers 182 that are coupled to a vacuum source, such as vacuum source 98 (FIG. 1). In the illustrated construction, a 12 psi vacuum is drawn in each base plate 178 with the vacuum source 98 generating approximately 70,000 lbf in each base plate 178 that releasably holds the base plate 178 to the surface 18. This force counteracts the torque created by brake assembly 142, without the use of permanent mounts inserted into the surface 18. Other constructions include different structures for releasably holding the base plates 178 to the surface 18.

The machine 10 may be used as a high speed balance machine for speeds up to approximately 3600 rpm, although other constructions include different values and ranges. In some constructions the machine 10 may also be used as a low speed balance machine (e.g., 400 rpm) by replacing the pedestals 38 with hard pedestals 38 containing dynamic rollers (e.g., rollers made by IRD®).

The machine 10 is sized and configured to balance components 44 that are up to approximately 100,000 lbs, and have lengths of up to approximately 35 feet and diameters of up to approximately 72 inches. However, other constructions permit differently sized components 44 to be balanced.

The machine 10 is able to measure vibration displacement, for example, of up to 0.010 mils peak-to-peak, although other constructions include different values and ranges for the amount of vibration that may be measured.

The machine 10 does not require external power to be operated. Rather, the machine 10 may be operated solely by a portable generator that forms part of the drive/controller 64.

The machine 10 is also easily transportable, and may be used on surfaces 18 that are as small as approximately 30 feet by 50 feet in size, although other sized surfaces 18 may also be used. The machine 10 may be shipped, for example, in an ISO standard 40 foot steel shipping container, and may also be shipped on a 53 foot flatbed truck or container trailer using ISO shipping lugs 186 as illustrated in FIG. 5. To assemble the machine 10, a forklift may be used to transport the base assembly 14 and lower the base assembly 14 onto the surface 18, after which point the members 106 and the pedestal assembly 34 are coupled to the base assembly 14 (if not already), and the housing 138 is placed around the base assembly 14, the members 106, and the pedestal assembly 34.

In some constructions the machine 10 may be used as a lathe, rather than a balance machine. For example, the pedestal assembly 34 may be replaced with v-blocks, and a compound assembly (not illustrated) may be mounted to the ways 26 for turning, polishing and grinding operations.

Figure 12:
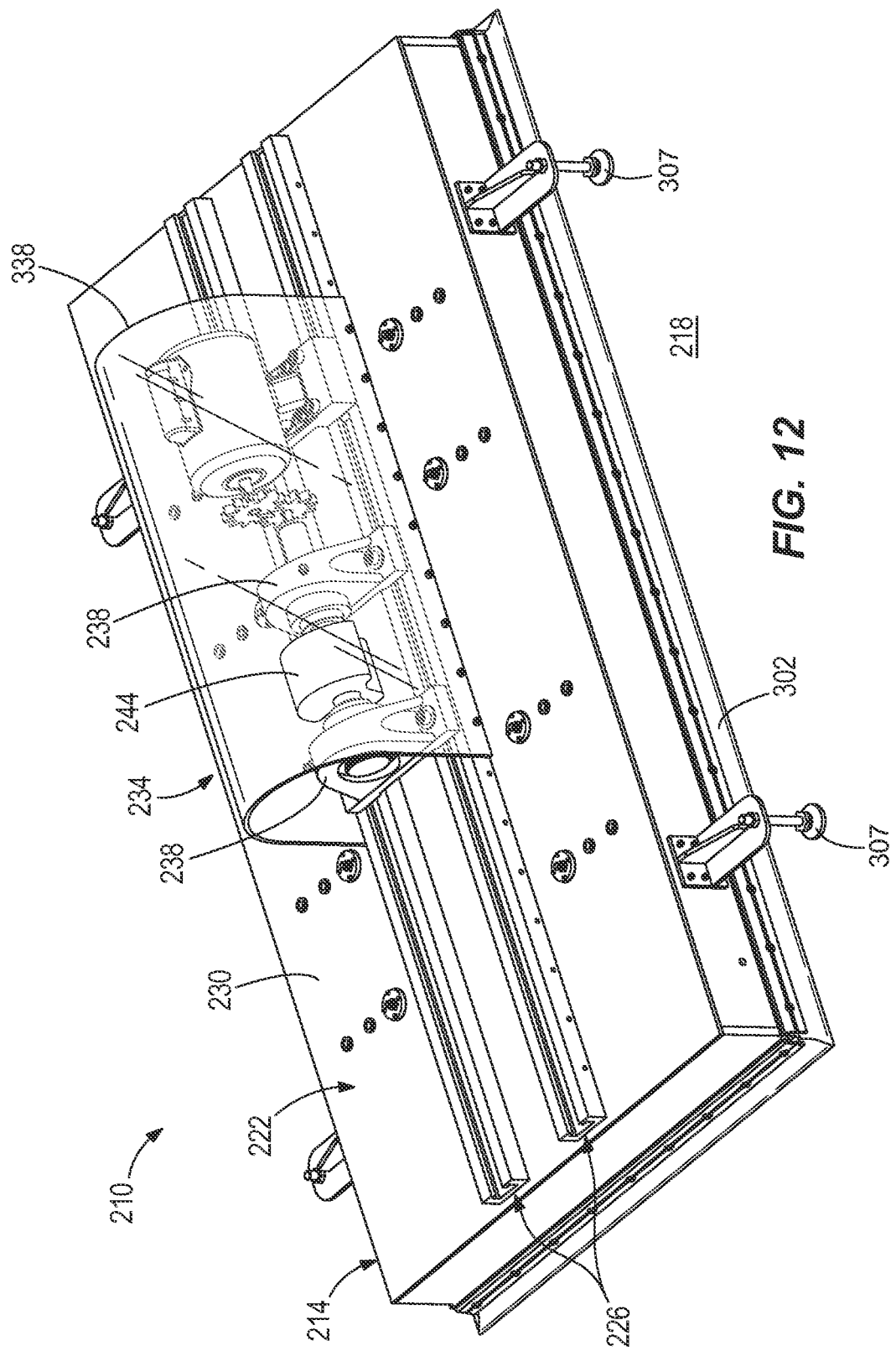
FIG. 12 is a perspective, partially schematic view of a balance machine according to another construction of the invention.

FIGS. 12-19 illustrate another portable high speed balance machine 210. With reference to FIG. 12, similar to the machine 10 the machine 210 includes a base assembly 214 sized and configured to rest upon a surface 218, such as a concrete floor (e.g., a concrete flooring of approximately 6.00 inch thickness and unreinforced). The base assembly 214 includes a decking 222 that is a rigid, elongate, generally rectangular structure, and includes two machine ways 226 disposed along a top surface 230 of the decking 222. The machine ways 226 are steel guide structures, and are disposed parallel to one another along the top surface 230. The machine ways 226 couple to and guide a pedestal assembly 234 or other machine component along the decking 22 to allow pedestals 238 to be positioned at any desired axial spacing from one another. The pedestals support a component 244 to be balanced (e.g., a rotor). The machine 210 also includes a housing 338 that at least partially surrounds and protects the pedestal assembly 234.

In some constructions the machine 210 has a component 44 (e.g., rotor) weight capacity of about 70,000 pounds, a component length capacity of about 30 feet, and a component diameter capacity of about 60 inches. In some constructions the machine 210 has a maximum speed of about 3,600 rpm, and a design unbalance (e.g., vibration displacement) of about 0.010 mils peak to peak. The machine 210 takes up a floor space of about 30 feet by 50 feet. Other constructions include different values and ranges than those described above.

Figure 13:
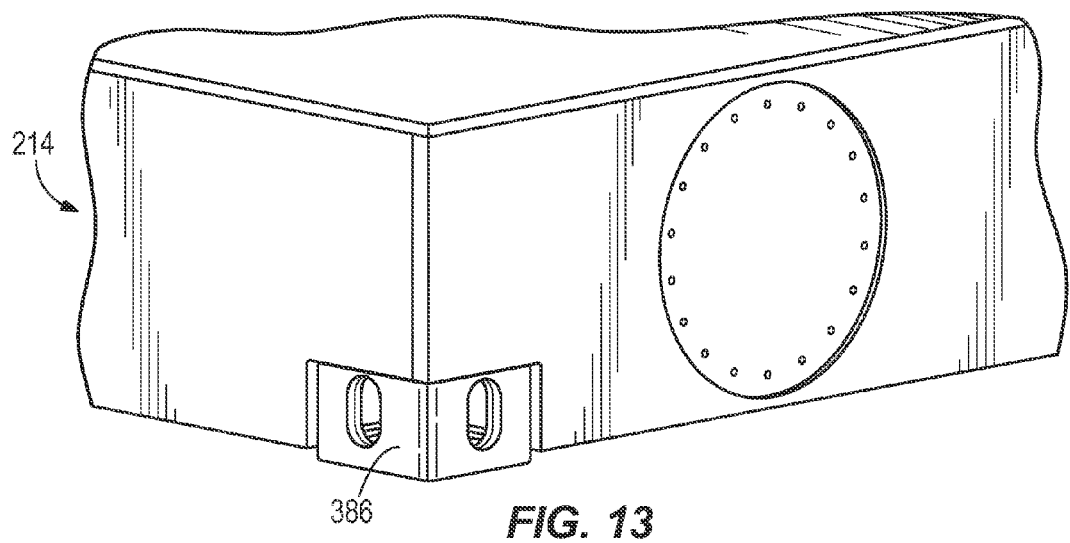
FIG. 13 is a partial perspective view of the balance machine of FIG. 12, illustrating a shipping lug.

With reference to FIG. 13, the machine 210 is easily transportable, and may be shipped, for example, in an ISO standard 40 foot shipping container, and may also be shipped on a 53-foot flatbed truck or container trailer using ISO shipping lugs 386. Once assembled, in some constructions the machine 210 may be powered with a remote, portable generator.

Figure 14:
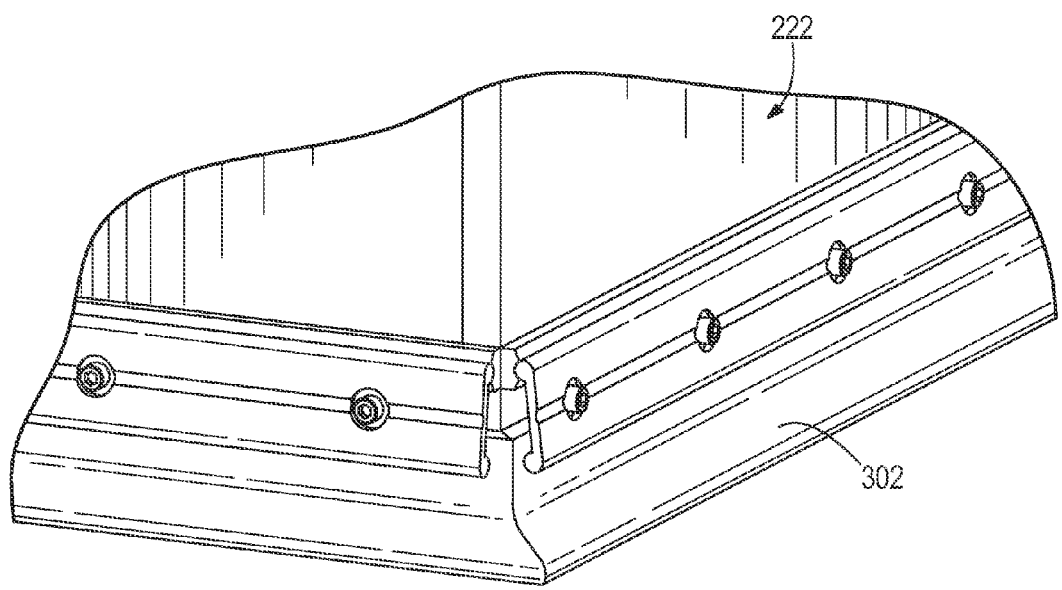
FIG. 14 is a partial perspective view of the balance machine of FIG. 12, illustrating an adjustable rubber base seal.

With reference to FIG. 14, the base assembly 214 is sealed to the surface 218 using an adjustable seal 302 (e.g., rubber seal) that is clamped to the decking 222 to allow for compensation for unevenness in the surface 218. The seal design is a custom profile design that creates a tight seal, with a high vacuum pressure kept within the base assembly 214. In some constructions the seal 302 is installed on site and is provided with a vulcanizing jig for assembling corners.

Figure 15:
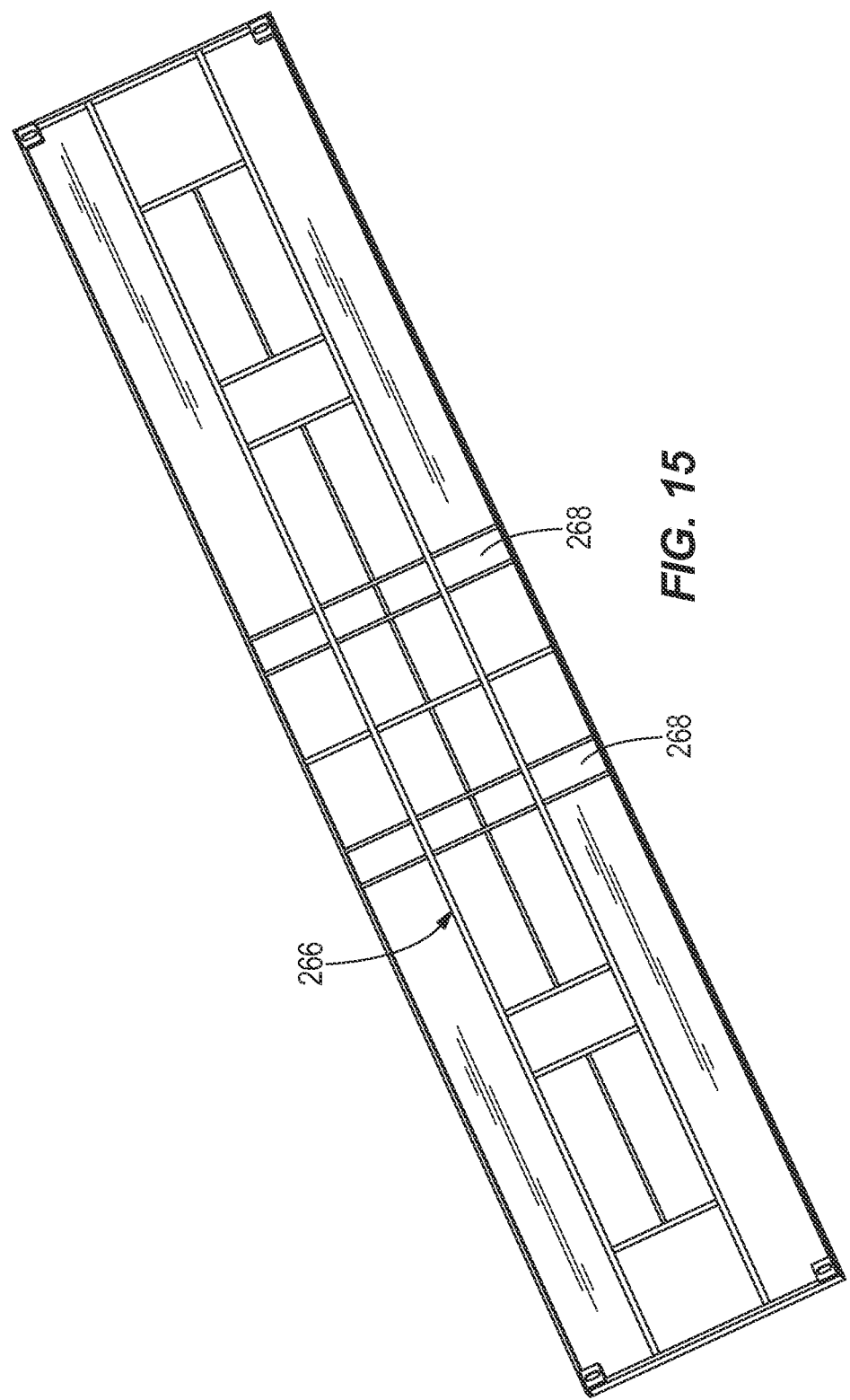
FIG. 15 is a bottom perspective view of a base assembly of the balance machine of FIG. 12.

With reference to FIG. 15, to assemble the machine 210, a forklift may be used to transport the base assembly 214 and lower the base assembly 214 onto the surface 218. As illustrated in FIG. 15, in some constructions the base assembly 214 includes a support structure 266 disposed beneath and coupled to the decking 222. The support structure 266 is a rigid fabricated structure made from steel plate capable of sustaining significant lateral and vertical loads. In some constructions the support structure 266 is sealed to the decking 222. The support structure 266 includes fork pockets 268 that are used to receive the forks on the forklift, so that the base assembly 214 is easily transported. The fork pockets 268 are designed in accordance with the requirements of an ISO 40 foot shipping container.

With reference to FIGS. 16-19, similar to the machine 10 the machine 210 includes at least one load-equalizing member 306 that is used to distribute loads acting on the base assembly 214 (e.g., due to the vacuum pressure generated within the base assembly 214).

Figure 16:
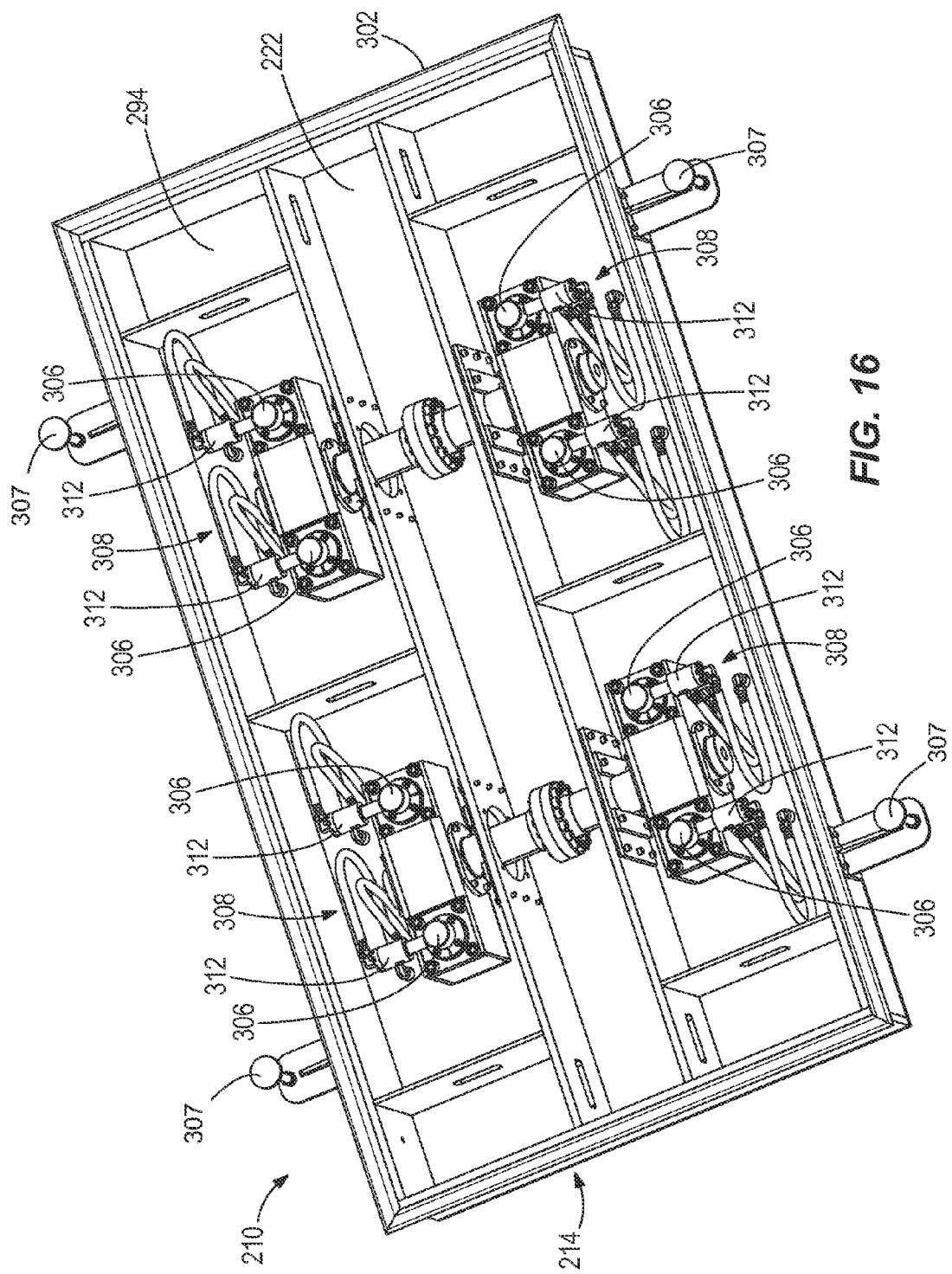
FIG. 16 is a bottom perspective view of the balance machine of FIG. 12.
Figure 17:
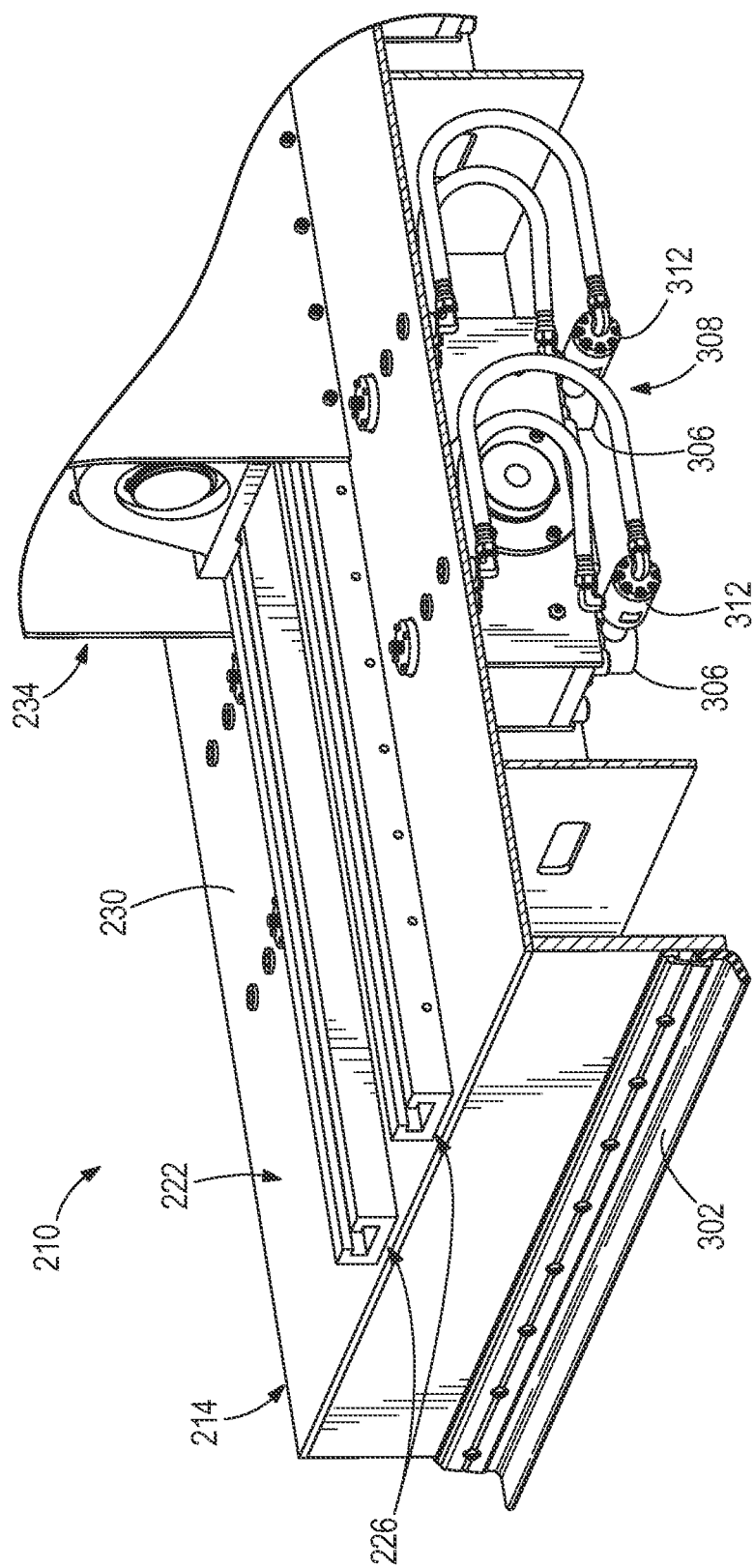
FIG. 17 is a partial, cross-sectional view of the balance machine of FIG. 12.

With reference to FIGS. 16 and 17, in the illustrated construction the machine 210 includes four load-supporting assemblies 308 disposed underneath the decking 222 and within a vacuum chamber 294 where vacuum pressure is generated (e.g., with a vacuum source like vacuum source 98 illustrated in FIG. 2). The assemblies 308 each include two accumulators 312 and two load-equalizing members 306 (e.g., hydraulic cylinders, similar to members 106). With reference to FIGS. 11 and 16-19, the members 306 are used to contact the surface 18 and to distribute a load.

The accumulators 312 dampen vibration from the component 244 (e.g., rotor) and produce a uniform and constant floor loading through a preload supplied by the vacuum pressure in the vacuum chamber 94. If required to compensate for dynamic forces a pressure regulator can be added to each member 306/accumulator 312 to control by PLC all pressures and to maintain equilibrium.

Figure 18:
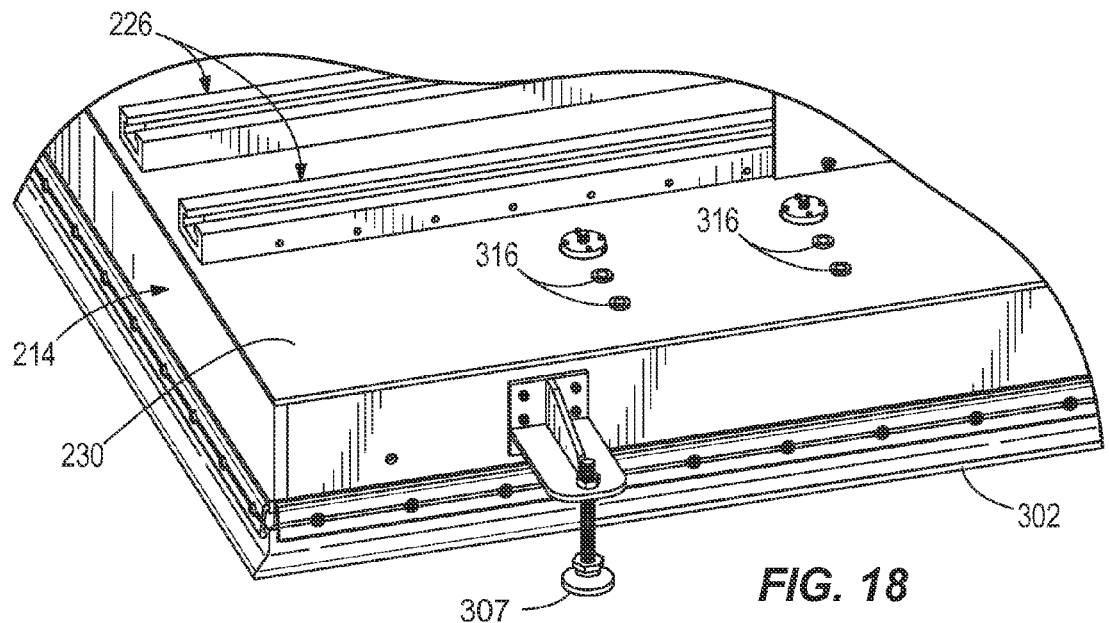
FIG. 18 is a partial perspective view of the balance machine of FIG. 12, illustrating hydraulic ports.

With reference to FIG. 18 the machine 10 also includes hydraulic ports 316 coupled to the members 306. The hydraulic ports 316 couple the members 306 to a pressure control module (e.g., a pressure control module like pressure control module 122 in FIG. 1), so that static pressure is maintained in each of the members 306, and so that each of the members 306 carries an equal load.

As with the machine 10, the members 306 are sized and configured to distribute a load (e.g., 550,000 lbs created with a 12 psi vaccum) such that a bending stress in the surface 218 remains acceptable. For example, where the surface 218 is a concrete flooring of approximately 6.00 inch thickness and unreinforced, the overall load distributed to the members 306 is such that a bending stress in the concrete flooring remains within acceptable standard limits (e.g., no greater than 3,000 psi per American Concrete Institute standards).

By evenly distributing the load, and using it as a preload for the accumulators 312, the load from the operating machine 210 is such that stresses are acceptable for thin concrete slabs as are typically in modern commercial building construction. This takes into account vacuum forces, component 244 weight, and dynamic loads from unbalance for example at 3,600 rpm.

Figure 19:
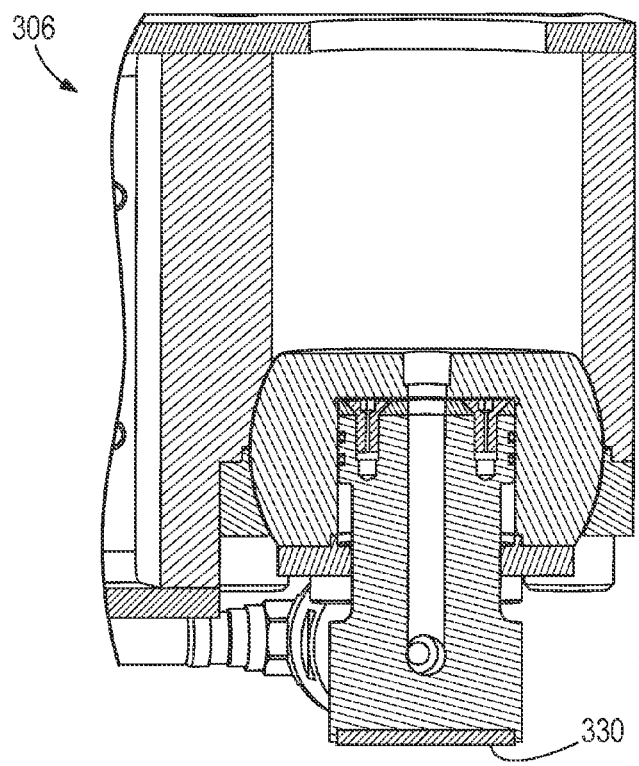
FIG. 19 is a cross-sectional view of an hydraulic cylinder used with the balance machine of FIG. 12.

With reference to FIG. 19, in some constructions the bottoms of at least some of the members 306 (e.g. bottom of hydraulic cylinders) contain a bonded high coefficient of friction rubber pad 330 (similar to friction pad 130) with an assumed coefficient of friction of 0.6 (typical is closer to 1.0 but 0.6 is used for conservatism). Dynamic lateral loads are thereby carried via friction between the load leveling pads 330 and the surface 218. The members 306 are designed to carry this lateral load through, for example, piston to cylinder contact.

In some constructions the members 306 are ball mounted within the support frame 226, such that the surface 218 need not be level or even. In some constructions the only means of force transmission from the component 44 (e.g., rotor) to the surface 218 is through hydraulic fluid within the members 306.

In some constructions a load is equalized amongst more or less than just the eight members 306 illustrated in the vacuum chamber 294 in FIGS. 16-19 (i.e., interior members). For example, in some constructions the machine 210 includes additional load equalizing members 306 inside and/or outside of the vacuum chamber 294, which are coupled to a pressure control module (e.g., a pressure control module like pressure control module 122 in FIG. 1), so that static pressure is maintained and so that each of the members 306 carries an equal load.

With reference to FIGS. 16-19, in some constructions the machine 210 also includes leveling members 307 external to the vacuum chamber 294 for leveling the machine ways 226 to ensure the machine ways 226 remain level once the vacuum is applied. In FIGS. 16-19, four such leveling members 307 are illustrated.

With reference to FIGS. 1 and 12, in some constructions the machine 210 includes twenty additional load equalizing members 306 to the eight already located in the vacuum chamber 294 (each of which is coupled to the pressure control module so that static pressure is maintained in each and so that each carries an equal load with the other members 306). In some constructions the machine 210 includes the four leveling members 307 illustrated in FIG. 16, the eight internal load equalizing members 306 illustrated in FIG. 16, and twenty additional load equalizing members 306 such as those illustrated in FIG. 1, for a total of thirty-two members 306 and 307 that evenly distribute a load and maintain an overall balance. Of course, other constructions include different numbers and arrangements.

While two machines 10 and 210 are illustrated and described, it is understood that any single element or set of elements described above with respect to machine 10 may be incorporated with machine 210, and any single element or set of elements described above with respect to machine 210 may be incorporated with machine 10, without departing from the scope of the invention. For example, while not illustrated, in some constructions the machine 210 may include a brake assembly and moment bars like brake assembly 142 and moment bars 166 illustrated in FIG. 1, and/or a controller like controller 64 in FIG. 1. Additionally, similar to machine 10, in some constructions the machine 210 may be used as a lathe, rather than a balance machine.

Overall, the machines 10 and 210 provide high speed balance, slow speed balance, lathe capabilities, and easy assembly/disassembly/portability. The machines 10, 210 require little space, and do not require extensive clean-up after use. The machines 10, 210 provide an efficient manner by which to temporarily balance a component, use a lathe, or otherwise perform a function on a component without the need for use of a permanent fixture or system.

Although the invention has been described in detail with reference to certain preferred embodiments, variations and modifications exist within the scope and spirit of one or more independent aspects of the invention as described.

The invention claimed is:

1. A portable machine comprising: a base assembly defining a vacuum chamber, the base assembly including a decking having a machine way; a machine component releasably coupled to the machine way; and a plurality of load-equalizing members coupled to the base assembly that evenly distribute and support a load positioned on the base, wherein the load-equalizing members include a plurality of hydraulic or pneumatic cylinders.

2. The portable machine of claim 1, wherein the base assembly includes a skirt and a seal disposed below the skirt to seal the base assembly to a ground surface.

3. The portable machine of claim 1, wherein the machine component is a pedestal assembly that includes two pedestals that are movable axially along the machine way relative to one another.

4. The portable machine of claim 3, wherein each pedestal is mounted on a spring-damper system that includes a set of springs and a damper to reduce dynamic forces.

5. The portable machine of claim 4, wherein the springs are pneumatic springs that each have a spring rate that is a function of a pressure supplied by an external pressure source.

6. The portable machine of claim 4, wherein the pedestal assembly also includes sensors coupled to the pedestals that measure unbalance based on motion in the spring-damper systems.

7. The portable machine of claim 3, further comprising a machine drive/controller that drives rotation of a component to be tested in the pedestal assembly, the machine drive/controller also releasably coupled to the machine way.

8. The portable machine of claim 1, wherein the base assembly includes a support structure disposed below the decking, the support structure including a metal frame with flanges and beams, wherein the support structure includes fork pockets to receive arms of a forklift to move the portable machine, and wherein at least one of the load-equalizing members is mounted within the support structure.

9. The portable machine of claim 1, wherein the base assembly includes a load-supporting assembly disposed in the vacuum chamber, the load-supporting assembly including an accumulator and a hydraulic cylinder.

10. The portable machine of claim 9, wherein the base assembly includes four load-supporting assemblies disposed in the vacuum chamber, each of the load-supporting assemblies including two accumulators and two hydraulic cylinders, at least one of the hydraulic cylinders including a friction pad to engage a ground surface beneath the vacuum chamber.

11. The portable machine of claim 1, wherein at least one of the load-equalizing members is disposed within the vacuum chamber, and at least another of the load-equalizing members is disposed outside of the vacuum chamber.

12. The portable machine of claim 1, further comprising a pressure control module, wherein each of the plurality of load-equalizing members is coupled to the pressure control module.

13. The portable machine of claim 12, wherein the decking includes hydraulic ports that couple the load-equalizing members to the pressure control module.

14. A portable machine comprising:
a base assembly defining a vacuum chamber, the base assembly including a decking and a seal below the decking that seals the base assembly to a ground surface, the decking including a machine way;
a pedestal assembly releasably coupled to the machine way above the vacuum chamber, the pedestal assembly including a first pedestal and a second pedestal that are separately movable axially relative to one another along the machine way;
a plurality of load-equalizing members coupled to the base assembly, the load-equalizing members including hydraulic cylinders that contact the ground surface to support the base assembly and pedestal assembly; and
a pressure control module that controls pressure within each of the hydraulic cylinders.

15. The portable machine of claim 14, wherein the base assembly includes a load-supporting assembly disposed in the vacuum chamber, the load-supporting assembly including an accumulator and a hydraulic cylinder.

16. The portable machine of claim 14, wherein at least one of the load-equalizing members is disposed within the vacuum chamber, and at least another of the load-equalizing members is disposed outside of the vacuum chamber.

17. The portable machine of claim 14, wherein each of the first pedestal and second pedestal are mounted on a spring-damper system that includes a set of springs and a damper to reduce dynamic forces.

18. The portable machine of claim 17, wherein the springs are pneumatic springs that each have a spring rate that is a function of a pressure supplied by an external pressure source.

19. The portable machine of claim 17, wherein the pedestal assembly also includes sensors coupled to the first and second pedestals that measure unbalance based on motion in the spring-damper systems.

20. The portable machine of claim 14, further comprising a machine drive/controller that drives rotation of a component to be tested in the pedestal assembly, the machine drive/controller releasably coupled to the machine way.

\* \* \* \* \*